(12) United States Patent
Hoye

(10) Patent No.: US 10,545,499 B2
(45) Date of Patent: *Jan. 28, 2020

(54) DETERMINING DRIVER ENGAGEMENT WITH AUTONOMOUS VEHICLE

(71) Applicant: Lytx, Inc., San Diego, CA (US)

(72) Inventor: Brett Hoye, San Marcos, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,038

(22) Filed: Jan. 4, 2019

(65) Prior Publication Data

US 2019/0155281 A1 May 23, 2019

Related U.S. Application Data

(63) Continuation of application No. 15/222,516, filed on Jul. 28, 2016, now Pat. No. 10,209,708.

(51) Int. Cl.
| | |
|---|---|
| *G05D 1/00* | (2006.01) |
| *B60K 28/02* | (2006.01) |
| *B60W 30/182* | (2012.01) |
| *B60W 40/08* | (2012.01) |
| *B60W 50/10* | (2012.01) |
| *B60W 50/14* | (2012.01) |
| *B60W 50/00* | (2006.01) |

(52) U.S. Cl.
CPC ............ *G05D 1/0061* (2013.01); *B60K 28/02* (2013.01); *B60W 30/182* (2013.01); *B60W 40/08* (2013.01); *B60W 50/10* (2013.01); *B60W 50/14* (2013.01); *B60W 2040/0818* (2013.01); *B60W 2050/0089* (2013.01); *B60W 2540/22* (2013.01); *B60W 2540/30* (2013.01)

(58) Field of Classification Search
CPC .. G05D 1/0061; B60W 30/182; B60W 50/10; B60W 50/14; B60W 40/08; B60W 2040/0818; B60W 2540/22; B60W 2540/30; B60K 28/02

See application file for complete search history.

(56) References Cited

U.S. PATENT DOCUMENTS

| | | |
|---|---|---|
| 9,858,832 B1 | 1/2018 | Hsu-Hoffman |
| 2004/0262063 A1 | 12/2004 | Kaufmann |
| 2009/0091435 A1 | 4/2009 | Bolourchi |
| 2010/0109908 A1 | 5/2010 | Miura |
| 2010/0152952 A1 | 6/2010 | Lee |
| 2012/0053805 A1* | 3/2012 | Dantu ............... B60W 40/09 701/70 |
| 2012/0083960 A1 | 4/2012 | Zhu |
| 2012/0100509 A1* | 4/2012 | Gunderson .......... G07C 5/0891 434/62 |
| 2012/0135382 A1* | 5/2012 | Winston ................ G09B 9/04 434/65 |

(Continued)

*Primary Examiner* — Mussa A Shaawat
(74) *Attorney, Agent, or Firm* — Van Pelt, Yi & James LLP

(57) ABSTRACT

A method, system, and computer program product of controlling driver interaction with an autonomous vehicle (AV) system for a vehicle are provided. In an embodiment, a signal indicating a present state of the driver is received. A signal indicating a past state of the driver is received. A present effectiveness of the driver is determined based on the received signals. A target level of engagement of the driver with the AV system is determined based on the present effectiveness of the driver.

20 Claims, 5 Drawing Sheets

(56) References Cited

U.S. PATENT DOCUMENTS

| | | | |
|---|---|---|---|
| 2012/0215375 A1* | 8/2012 | Chang | B60W 50/14 |
| | | | 701/1 |
| 2012/0221216 A1* | 8/2012 | Chauncey | B60W 40/09 |
| | | | 701/51 |
| 2013/0141249 A1* | 6/2013 | Pearlman | G09B 19/14 |
| | | | 340/870.03 |
| 2013/0316311 A1* | 11/2013 | England | G09B 19/167 |
| | | | 434/65 |
| 2014/0156133 A1 | 6/2014 | Cullinane | |
| 2014/0272810 A1 | 9/2014 | Fields | |
| 2014/0303827 A1 | 10/2014 | Dolgov | |
| 2015/0175168 A1 | 6/2015 | Hoye | |
| 2016/0203560 A1 | 7/2016 | Parameshwaran | |
| 2016/0325779 A1 | 11/2016 | Zwicky | |
| 2017/0305434 A1 | 10/2017 | Ratnasingam | |
| 2017/0349186 A1 | 12/2017 | Miller | |
| 2017/0355377 A1 | 12/2017 | Vijaya | |
| 2018/0004211 A1* | 1/2018 | Grimm | G01C 21/3407 |

\* cited by examiner

100

400

500

600

DETERMINING DRIVER ENGAGEMENT WITH AUTONOMOUS VEHICLE

CROSS REFERENCE TO OTHER APPLICATIONS

This application is a continuation of co-pending U.S. patent application Ser. No. 15/222,516 entitled DETERMINING DRIVER ENGAGEMENT WITH AUTONOMOUS VEHICLE filed Jul. 28, 2016 which is incorporated herein by reference for all purposes.

BACKGROUND OF THE INVENTION

The introduction of an autonomous vehicle system (AV) into a vehicle poses challenges for drivers operating the vehicle and for monitoring the driver's behavior. The AV can control the vehicle to various degrees, for example braking, accelerating, and/or steering. The AV may be engaged and disengaged such that the vehicle transitions between control by the AV system and by the driver.

When an AV is available for a vehicle, there are several challenges for drivers and monitoring the driver's behavior, including determining the driver's readiness to operate the vehicle, monitoring driver, and maintaining driver alertness.

It is important to accurately determine when a driver is ready to operate the vehicle with the aid of the AV because if an AV is de-activated prematurely driving accidents may result because a driver is confused or unable to share control of the vehicle with the AV. When an AV system is engaged for at least part of a trip, it may be more difficult to monitor the driver and maintain driver alertness compared to monitoring the driver without an active AV. Conventional methods for monitoring a driver include a percentage of eye closure system (PERCLOS) and steering wheel sensors, which measure eyelid closure, eye gaze, fitness to lane to gauge the drowsiness of a driver. Conventional methods for maintaining driver alertness include requiring a driver to periodically push a button inside the vehicle. However, these conventional methods do not effectively monitor or maintain driver alertness. Thus, there is a need in the art to more effectively monitor and maintain driver alertness.

BRIEF DESCRIPTION OF THE DRAWINGS

Various embodiments of the invention are disclosed in the following detailed description and the accompanying drawings.

DETAILED DESCRIPTION

Figure 1:
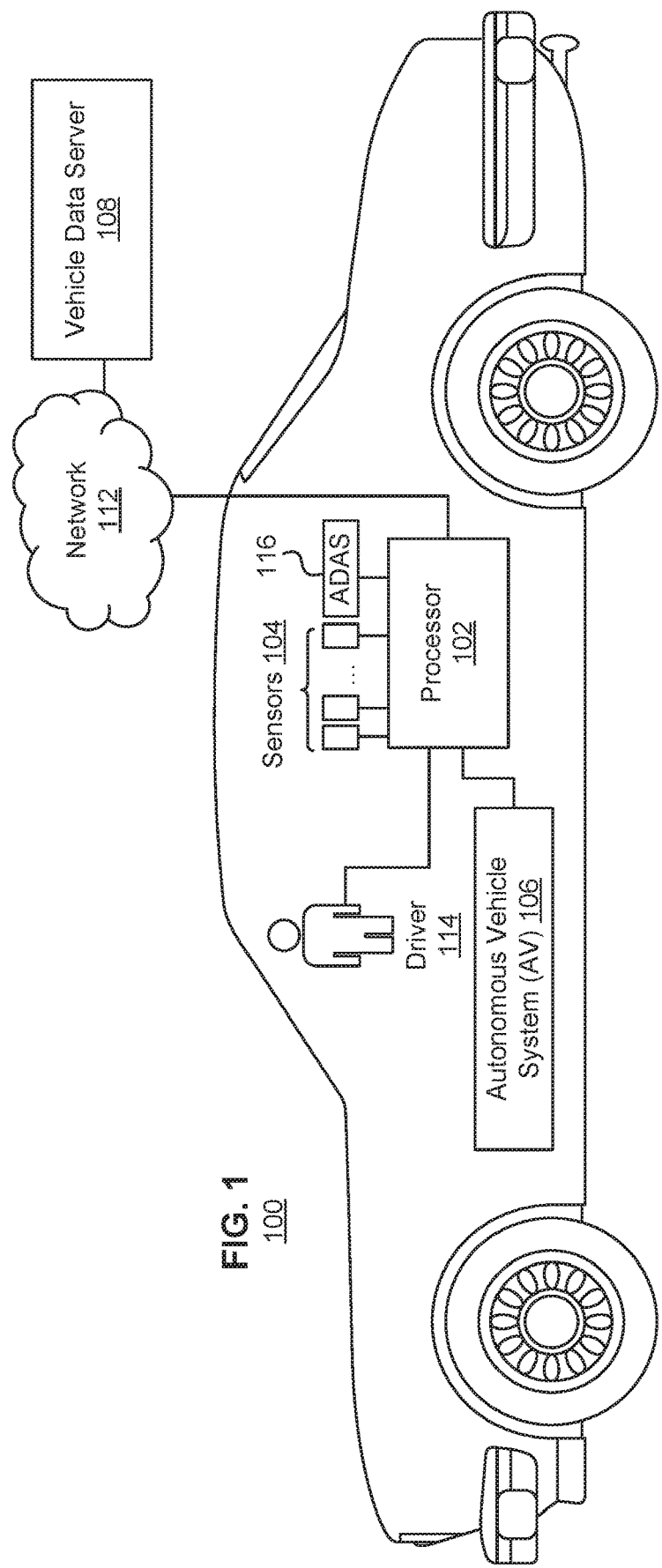
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques of the present disclosure determine driver readiness to take control of the vehicle, monitor driver behavior, and maintain driver skill. In particular, the techniques described herein find application in vehicles with an autonomous vehicle system (AV), where the AV can control vehicle operation, for example braking, accelerating, and/or steering.

When an AV system is engaged for at least part of a trip, a driver might not always be ready to operate the vehicle with an active AV. Over time, a driver's readiness to take control from the AV may also change. Driver readiness can be based on the driver's ability to take control of the vehicle when the vehicle transitions between engagement and disengagement of the AV. For example, a driver who has difficulty taking control of the vehicle after a period of idleness is not ready to operate a vehicle having an AV. Whether a driver has difficulty taking control of the vehicle can be determined by monitoring driver and/or vehicle behavior, as further described herein. Conventional techniques does not adequately help determine driver readiness.

When an AV system is engaged for at least part of the trip, it may be more difficult to monitor a driver because when an AV controls the vehicle, vehicle behavior does not reflect on the driver's skill in the same way as monitored driver behavior for a vehicle without an active AV. For example, vehicle behavior may be due at least on part on the AV. Conventional techniques do not adequately help determine driver readiness, for example, because they do not identify what activity a driver is doing and whether the activity decreases the driver's effectiveness.

When an AV system is engaged for at least part of a trip, a driver's skill may change differently over time compared with traditional driving situations not involving AVs. For example, a driving skill may atrophy when the AV is controlling the vehicle and the driver does not have an opportunity to practice the skill. Conventional techniques do not adequately help maintain driver alertness, for example, because they do not target a particular driving skill that degrades due to lack of practice.

FIG. 1 is a block diagram illustrating an embodiment of a system 100 for controlling driver interaction with an autonomous vehicle system. The system 100 includes a processor 102, an autonomous vehicle system (AV) 106, a vehicle data server 108, sensors 104, and an advanced driver assistance system (ADAS) 116.

The processor 102 is configured to perform the methods described herein. For example, the processor 102 monitors a driver's skill and changes to the driver's skill over time to determine the driver's effectiveness, experience, and coaching needs. The processor 102 establishes a new baseline skill level if the processor observes that the driver consistently performs at a particular level. The processor 102 measures the change in a driver's skill over time by comparing the driver's performance with previous events and trips. The processor 102 determines when a driver is capable of taking control of a vehicle having an AV, as further described herein with respect to FIGS. 4 and 5. The processor 102 is configured to determine when to engage and disengage the AV during a trip according to the techniques described herein. The processor 102 maintains driver alertness. For example, even when the AV mode is available, the processor 102 can recommend that the driver take control to practice a driving skill, as further described herein with respect to FIG. 6. In some embodiments, the processor 102 is configured to record events and report the events to the vehicle data server 108.

In an embodiment, the processor 102 includes a vehicle event recorder (not shown). In an alternative embodiment, the vehicle event recorder is external to the processor 102 and coupled to the processor, using at least part of the processing function of the processor to perform the functions of the vehicle event recorder described herein. The vehicle event recorder stores data about the vehicle such as data collected by the sensors 104. In some embodiments, the vehicle event record analyzes data collected by the sensors 104 to identify and determine "events," and record these events. An event can be vehicle sensor readings indicating a particular set of circumstances such as risky driving behavior, arrival at a location, road conditions, and the like. An event or set of circumstances can be determined based on past experience, a pattern of sensor readings, matching sensor readings to predetermined threshold values, etc. The vehicle event recorder is further described herein, e.g., with respect to FIG. 2.

The processor 102 is communicatively coupled to the AV 106. The processor 102 is communicatively coupled to the vehicle data server 108 over a network 112. In the example shown, the processor 102 is onboard a vehicle. In an alternative embodiment, the processor 102 is provided outside the vehicle and communicatively coupled to the vehicle. For example, at least some of the functions of the processor 102 can be implemented in the vehicle data server 108. In some embodiments, the processor is coupled to a data storage or include a data storage, the data storage storing instructions executable by the processor to perform the methods described herein.

The AV 106 is configured to control a vehicle. For example, the AV controls the brakes, acceleration, and/or steering of the vehicle. When the AV is in control of the vehicle, the driver may relinquish control of the vehicle. The driver may monitor and engage with the AV to varying degrees. In some embodiments, the driver may monitor the AV by placing hands on the steering wheel, which indicates preparedness to take over control of the vehicle. In other embodiments, the driver may monitor the AV with hands off the steering wheel and receive a warning to prepare to take over control of the vehicle.

The sensors 104 include recorders that capture visual and audio aspects of the vehicle. Example sensors include a video recorder, an audio recorder, an accelerometer, a gyroscope, a vehicle state sensor, a proximity sensor, a global positioning system (GPS), a temperature sensor, moisture sensor, a laser line tracker sensor, and the like. A video recorder can include an exterior video camera, an exterior still camera, an interior video camera, an interior still camera. An audio recorder can include a microphone. The sensors 104 can record a state of the vehicle. Example sensors include a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, and the like.

The ADAS 116 includes systems for driving safety such as rear view cameras to assist in backing up the vehicle, lane departure detectors, and any other appropriate system. The ADAS 116 provides information regarding driving behavior that can be useful for determining a driver's effectiveness. In some embodiments, one or more of the sensors 104 and ADAS 116 are integrated with the processor 102.

The vehicle data server 108 stores state data including driver data and vehicle data. The state data can include various states recorded over time. In an embodiment, the vehicle data server 108 stores information such as policy information and/or environmental information. Policy information includes policies defined by organizations that can be applied across one or more driving situations. For example, policy can dictate that AV is disengaged whenever it is raining regardless of driver effectiveness. Environmental information includes data regarding driving conditions such as constructions zones, heavy traffic areas, and the like. In an embodiment, the vehicle data server 108 is external to or remote from the vehicle. For example, the vehicle data server 108 can be located at a cloud service provider, a home station (e.g., a shipping company office, a taxi dispatcher, a truck depot, etc.), a colocation center (e.g., a center where equipment, space, and bandwidth are available for rental), and the like. The vehicle data server 108 is configured to: receive event data and driver behavior data detected by the sensors 104, receive data from one or more vehicle event recorders, analyze data such as data received from the sensors 104, display data such as the data from the sensors 104 and/or analyzed data. The data recorded by the sensors 104 ("sensor data") can be downloaded to the vehicle data server 108 in various ways. For example, the sensor data can be downloaded when the vehicle reaches the home station, downloaded wirelessly, etc. The vehicle data server 108 is further described herein, e.g., with respect to FIG. 3.

The network 112 includes any combination of: a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network.

In operation, the processor 102 receives present state data from the sensors 104. The processor 102 receives past state data from the vehicle data server 108. The processor 102 provides an output to the driver 114 via a user interface. Based on the present state data and the past state data, the processor 102 determines a target engagement level of the driver and the AV according to the methods described herein. The processor 102 then provides a recommendation to the driver 114 to adjust the AV or a warning to the driver 114 that the AV 106 will be engaged or disengaged.

Figure 2:
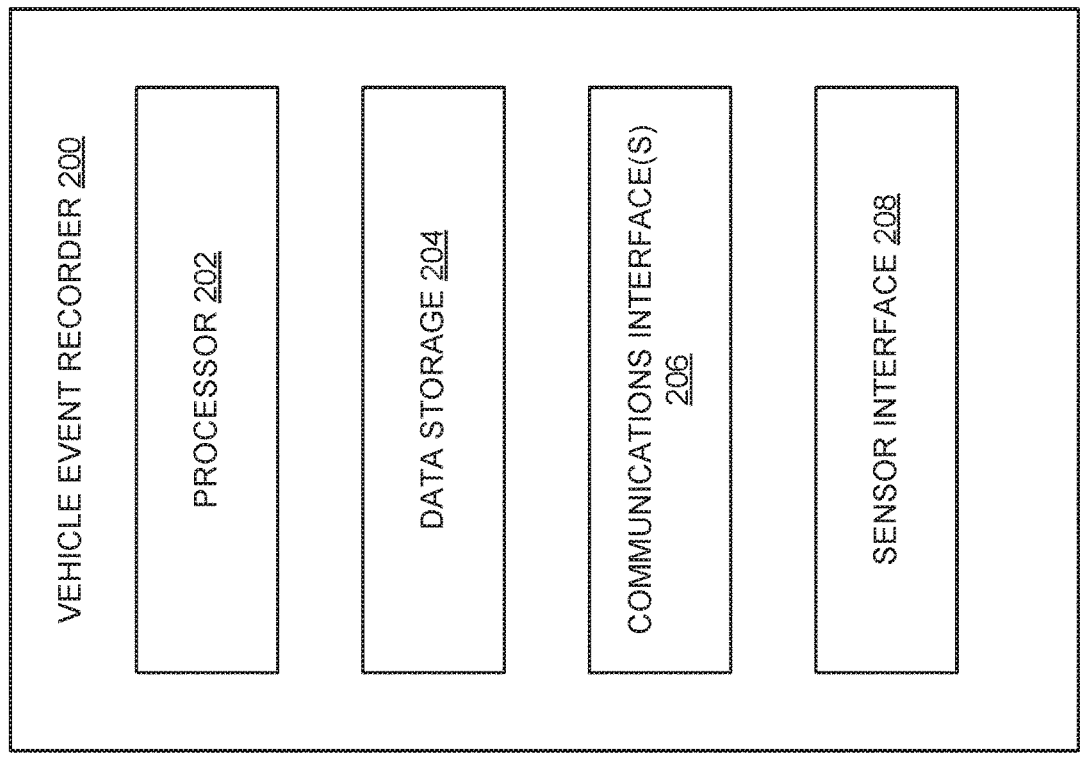
FIG. 2 is a block diagram illustrating an embodiment of a vehicle event recorder.

FIG. 2 is a block diagram illustrating an embodiment of a vehicle event recorder 200. The vehicle event recorder 200 includes a processor 202, data storage 204, one or more communications interfaces 206, and a sensor interface 208.

The processor 202 controls operations of the vehicle event recorder 200 such as reading from and writing to the data storage 204, communicating via the communications interface 206, and/or reading data via the sensor interface 208. In an embodiment, the processor 202 can store a set of circumstances as an event. The processor can determine whether to store an event based on sensor readings indicating a particular set of circumstances such as risky driving behavior, arrival at a location, road conditions, and the like. An event or set of circumstances can be determined based on past experience, a pattern of sensor readings, matching sensor readings to predetermined threshold values, etc. For example, the processor receives compliance data, where the compliance data describes sensor readings matching an acceptable behavior. The processor compares sensor readings to the compliance data. In an embodiment, if the sensor readings do not meet the compliance data, the processor stores the sensor readings as a non-compliant event. In an embodiment, if the sensor readings meets the compliance data, the processor stores the sensor readings as a compliant event or does not store the sensor readings as an event.

The data storage 204 stores instructions executable by the processor 202 to perform functions of the vehicle event recorder. The data storage 204 stores data about the driver and one or more vehicles such as scores for driver readiness, present state data, vehicle event recorder data, sensor data, video data, map data, machine learning algorithm data, or any other appropriate data. The data storage 204 can be implemented using one or more of: random access memory (RAM), read only memory (ROM), nonvolatile memory, flash memory, a hard disk, and the like.

The communications interface(s) 206 can include one or more device for input and output from the vehicle event recorder. The communications interface(s) can enable communication with any type of network, e.g., packet-switched and/or circuit-switched networks. The communications interface(s) can include any combination of a wired interface or a wireless interface. Example communication interfaces include a GSM interface, a CDMA interface, a LTE interface, a Wi-Fi® interface, an Ethernet interface, a Universal Serial Bus (USB) interface, a Bluetooth® interface, an Internet interface, and the like.

The sensor interface 208 includes an interface to one or more sensors such as the sensors 104 shown in FIG. 1. In an embodiment, the sensor interface 208 includes an on-board diagnostics (OBD) bus (e.g., society of automotive engineers (SAE) J1939, J1708/J1587, OBD-II, CAN BUS, etc.). The vehicle event recorder 200 can communicate with the sensors via the OBD bus, wireless connection, and the like.

Figure 3:
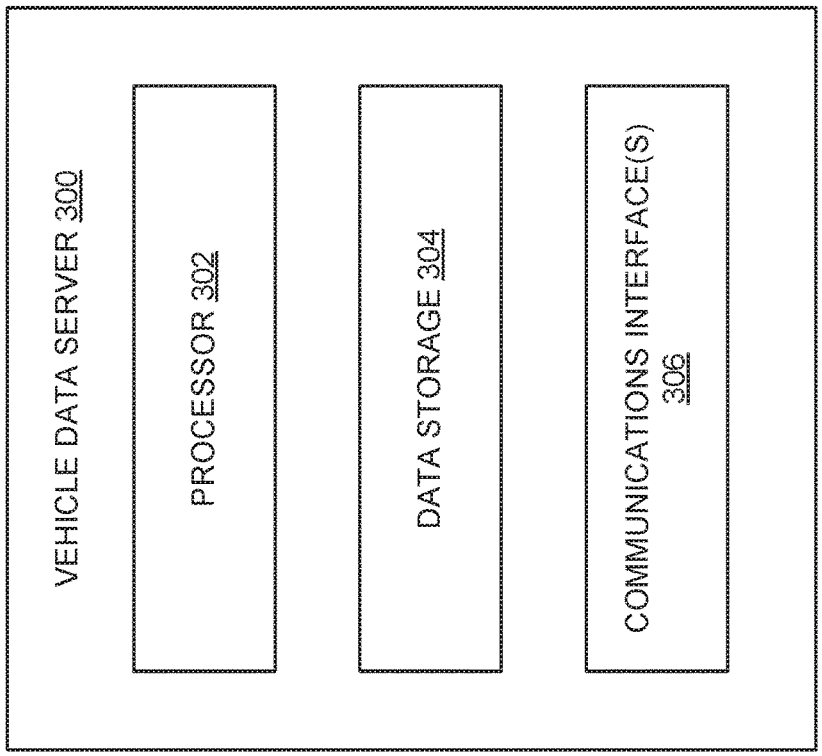
FIG. 3 is a block diagram illustrating an embodiment of a vehicle data server.

FIG. 3 is a block diagram illustrating an embodiment of a vehicle data server. The vehicle data server 300 includes a processor 302, data storage 304, and communications interface(s) 306.

The processor 302 controls operations of the vehicle data server 300 such as the methods described herein and/or determining a route, set of route segments, a route segment safety score, a speed distribution, collecting speed data, and the like. The processor 302 receives data from one or more vehicle event recorders, and determines driver engagement with the AV based on the received data and past data state (stored in the data storage 304) according to the methods described herein.

The data storage 304 stores instructions executable by the processor 302 to perform functions of the vehicle data server. The data storage 304 stores past state data, vehicle event recorder data, sensor data, video data, map data, machine learning algorithm data, or any other appropriate data. The data storage 304 can be implemented using one or more of: RAM, ROM, nonvolatile memory, flash memory, a hard disk, and the like.

The communications interface(s) 306 can include one or more device for input and output from the vehicle event recorder. The communications interface(s) can enable communication with any type of network, e.g., packet-switched and/or circuit-switched networks. The communications interface(s) can include any combination of a wired interface or a wireless interface. Example communication interfaces include a GSM interface, a CDMA interface, a LTE interface, a Wi-Fi® interface, an Ethernet interface, a USB interface, a Bluetooth® interface, an Internet interface, and the like.

Figure 4:
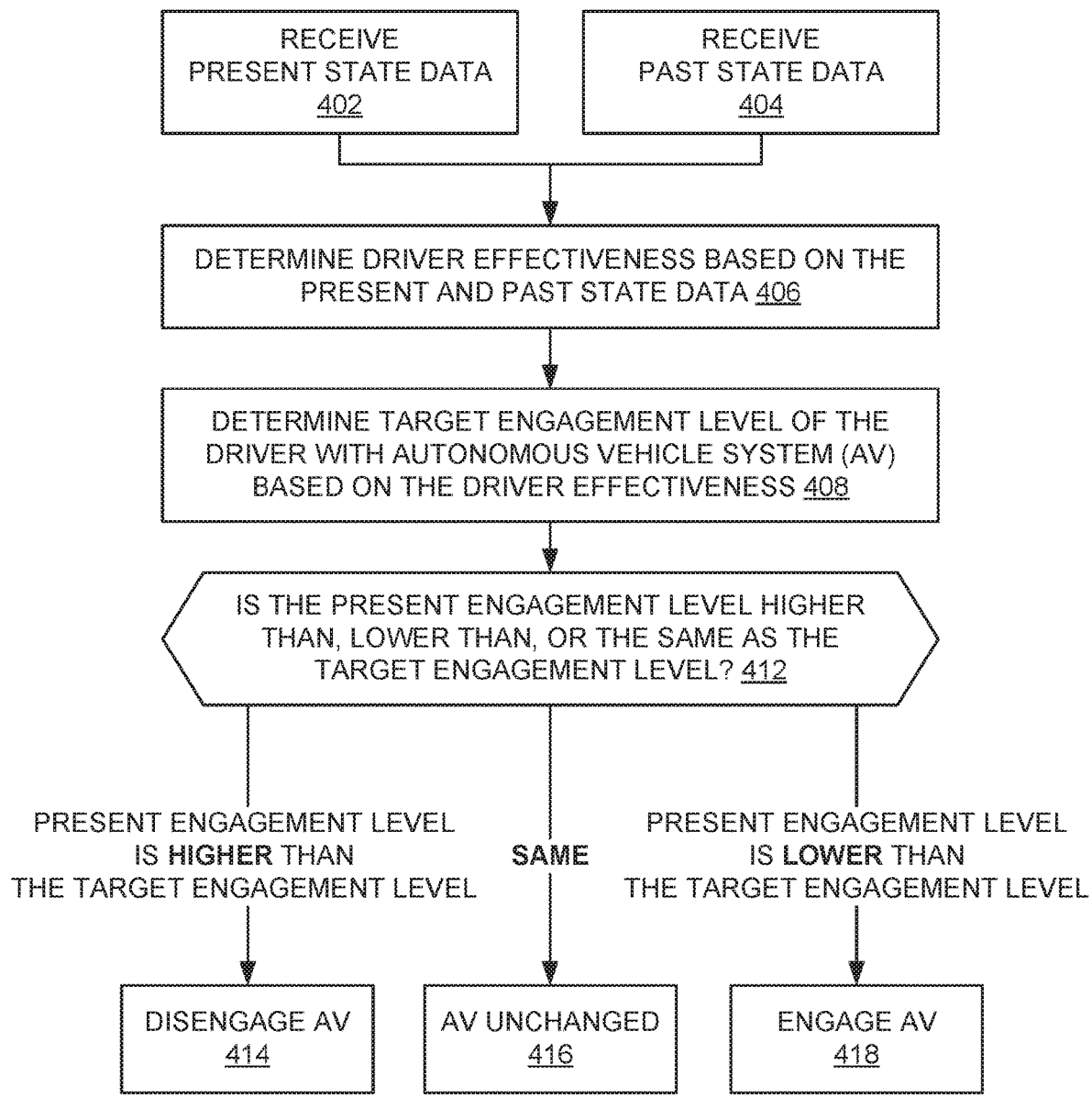
FIG. 4 is a flowchart illustrating an embodiment of a process for determining driver engagement with an autonomous vehicle system.

FIG. 4 is a flow diagram illustrating an embodiment of a method 400 for controlling driver interaction with an autonomous vehicle system (AV). The method 400 can be performed by a processor (e.g., the processor 102 and/or the vehicle data server 108 of FIG. 1). In 402, the method 400 receives present state data. The present state data includes data about a current state of the driver such as reactions to the environment, alertness, emotion, and the like. The present state data can include or be based on one or more sensor readings. Present state data about a driver can include an evaluation of the driver's performance. For example, a sensor reading can be compared with a target or threshold value to determine deviation from an expected value. The deviation can indicate the driver's performance such as the driver's effectiveness. Example sensors include video recorders and audio recorders. A video recorder with 4D imaging capabilities determines what the driver is currently doing based on detection of the position and movement of the driver's body. The video recorder can detect an activity that a driver is engaged in such as reading a book, texting, sleeping, and the like. The video recorder can detect eye movement to determine a driver's state. For example, frequent eye blinking indicates that the driver is likely to be drowsy. The audio recorder can detect sounds inside the vehicle. For example, a yawn indicates that the driver is likely to be drowsy. As further described herein, other sensors and combinations of sensors are possible.

In 404, the method 400 receives past state data. The past state data includes data about the vehicle and a past state of the driver. The vehicle data includes information about the vehicle such as make, model, and maintenance history. The past state information can be stored as an analytical model associated with an identity of the driver. The vehicle data can affect driver behavior and be used to predict driver behavior. The past state of the driver can include events such as how recently the driver napped, the duration of a previous work shift, and the like. The past state of the driver can be captured in a behavior profile. The behavior profile includes an identification of the driver and the driver's behavioral patterns. The past behavior of the driver can predict future driving behavior. For example, a driver will likely react to a future situation in a similar way to how the driver reacted to similar situations in the past. The driver's past performance and interaction with an AV can also predict future interactions with the AV. Thus, the identification of the driver (e.g., a corresponding behavior profile) indicates a general effectiveness or experience of the driver and establishes expectations for driver behavior and reactions to road conditions.

In 406, the method 400 determines the driver's effectiveness based on the present and past state data. The driver's effectiveness is determined by the present state data received in 402. For example, the driver's effectiveness is directly related to the alertness of the driver and inversely related to the driver's drowsiness. The driver's effectiveness is also determined by the past state data received in 404. For example, how easily the driver gets drowsy or distracted affects his effectiveness. As another example, the driver's age, experience with a particular type of vehicle, physical fitness, previous traffic violations, and the like affects his effectiveness. Certain past events such as a suspended driver's license can disqualify the driver from driving. The driver's pattern of behavior can also indicate the driver's effectiveness over the course of a trip. As further described herein, the driver's past behavior can predict future behavior. Thus, a driver's past pattern of behavior can indicate his effectiveness. The driver's effectiveness can change during the course of a trip. For example, a driver who, in the past, has exhibited decreased effectiveness after six hours of driving is expected to have decreased effectiveness after six hours on a current trip. The method 400 can score the driver's effectiveness. The driver's effectiveness score can be determined based on a weighting of factors including a weighting of present and past state data.

In 408, the method 400 determines a target engagement level of the driver with the AV based on the effectiveness of the driver. For instance, a relatively effective driver has a higher target engagement level because an effective driver is better prepared to take over control of the vehicle and transition between engagement and disengagement of the AV compared with a less effective driver. On the other hand, a relatively ineffective driver has a lower target engagement level because an ineffective driver has a more difficult time taking control of the vehicle and transitioning between engagement and disengagement of the AV.

In an alternative embodiment, the target engagement level is based on how attentive the driver is and whether the attentiveness of the driver is sufficient to maintain an experience rating. The attentiveness of the driver can be determined based on driver reaction to road conditions. For example, the driver's level of drowsiness (e.g., measured by an interior video recorder) can lower the attentiveness of the driver. Better vehicle handling indicates greater driver attentiveness. The quality of vehicle handling can be based on whether the vehicle stays between lane markers, how close a vehicle wheel is to a lane marker, maintaining distance between vehicles in front of and behind the vehicle, handling adverse conditions, and the like. An experience rating can be based on one or more past states of the driver. For example, a driver who is typically highly attentive can be given a higher experience rating than one who is typically not as highly attentive. As another example, a driver who has experienced broader conditions (e.g., road types, weather, traffic, etc.) and/or handled a vehicle for a longer period of time (e.g., taking a longer shift, driving for more years) has a higher experience rating than one who has not had recent experiences or handled the vehicle for as long.

The target engagement level can be determined dynamically as the target engagement level may change with a driver's changing effectiveness. For example, a driver who is historically ineffective after being idle for six hours may have a relatively high target engagement level at the beginning of the six-hour period and a relatively low target engagement level at the end of the six-hour period. The target engagement level can define, among other things, (i) how frequently the AV is engaged when the driver is inside the vehicle, (ii) driving situations in which the AV should be engaged, and (iii) whether or not a driver should be in control of the vehicle. Whether a driver should be in control of a vehicle may be due to various factors such as a need to practice a driving skill or the driver's readiness to operate a vehicle having an AV system. In an embodiment, one or more of the factors can be more heavily weighted or override one or more of the other factors in making the determination of whether the driver should be in control of the vehicle.

In 412, the method 400 determines whether the present engagement level of the driver with the AV is higher than, lower than, or the same as the target engagement level. The present engagement level of the driver with the AV is a measure of how engaged the driver is with the AV. The driver's engagement with the AV is high if the AV is engaged and controlling the vehicle. The driver's engagement with the AV is low if the AV is disengaged and not controlling the vehicle.

In 412, if the method 400 determines that the present engagement level is higher than the target engagement level, the method 400 proceeds to 414, in which the method makes a recommendation to disengage the AV system. The recommendation may be in the form of an audio signal, a visual signal, a haptic signal, or the like to prompt the driver to disengage the AV system. In an alternative embodiment, the method 400 automatically disengages the AV system. In some embodiments, when the AV system is disengaged, the driver takes over control of the vehicle and has an opportunity to practice a driving skill. This helps a driver to maintain or improve the driving skill. In some embodiments, when the AV system is disengaged, the vehicle will be automatically guided to a stop. This improves safety by preventing the driver from operating the vehicle when the driver is unfit. As further described herein, in 414, disengaging the AV may include providing a warning to the driver prior to the disengagement, the timing of the warning being dependent on the driver's effectiveness determined in 406.

In 412, if the method 400 determines that the present engagement level is the same as the target engagement level, the method 400 proceeds to 416, in which the AV system remains unchanged.

In 412, if the method 400 determines that the present engagement level is lower than the target engagement level, the method 400 proceeds to 418, in which the method makes a recommendation to engage the AV system. The recommendation may be in the form of an audio signal, a visual signal, a haptic signal, or the like to prompt the driver to engage the AV system. In an alternative embodiment, the method 400 automatically engages the AV system. In some embodiments, when the AV system is engaged, the driver relinquishes control of the vehicle. This can allow the driver to rest for a period of time, while the AV controls the vehicle. In some embodiments, the driver continues to monitor the vehicle while the AV is engaged, e.g. keeping hands on a steering wheel. As further described herein, engaging the AV may include providing a warning to the driver prior to the engagement, the timing of the warning being dependent on the driver's effectiveness determined in 406.

In some embodiments, the method 400 provides a notification responsive to engagement or disengagement of the AV. The notification includes information about the state of the AV such as the circumstances for the change to the AV. For example, the notification is sent over a network to a central server (e.g., the vehicle data server 108 of FIG. 1). In some embodiments, a dispatcher can view the notification and use the information in the notification to determine whether the driver needs further coaching or work with a simulator. In some embodiments, the determination of whether the driver needs further coaching or work with a simulator is performed systematically or automatically, as further described herein.

Figure 5:
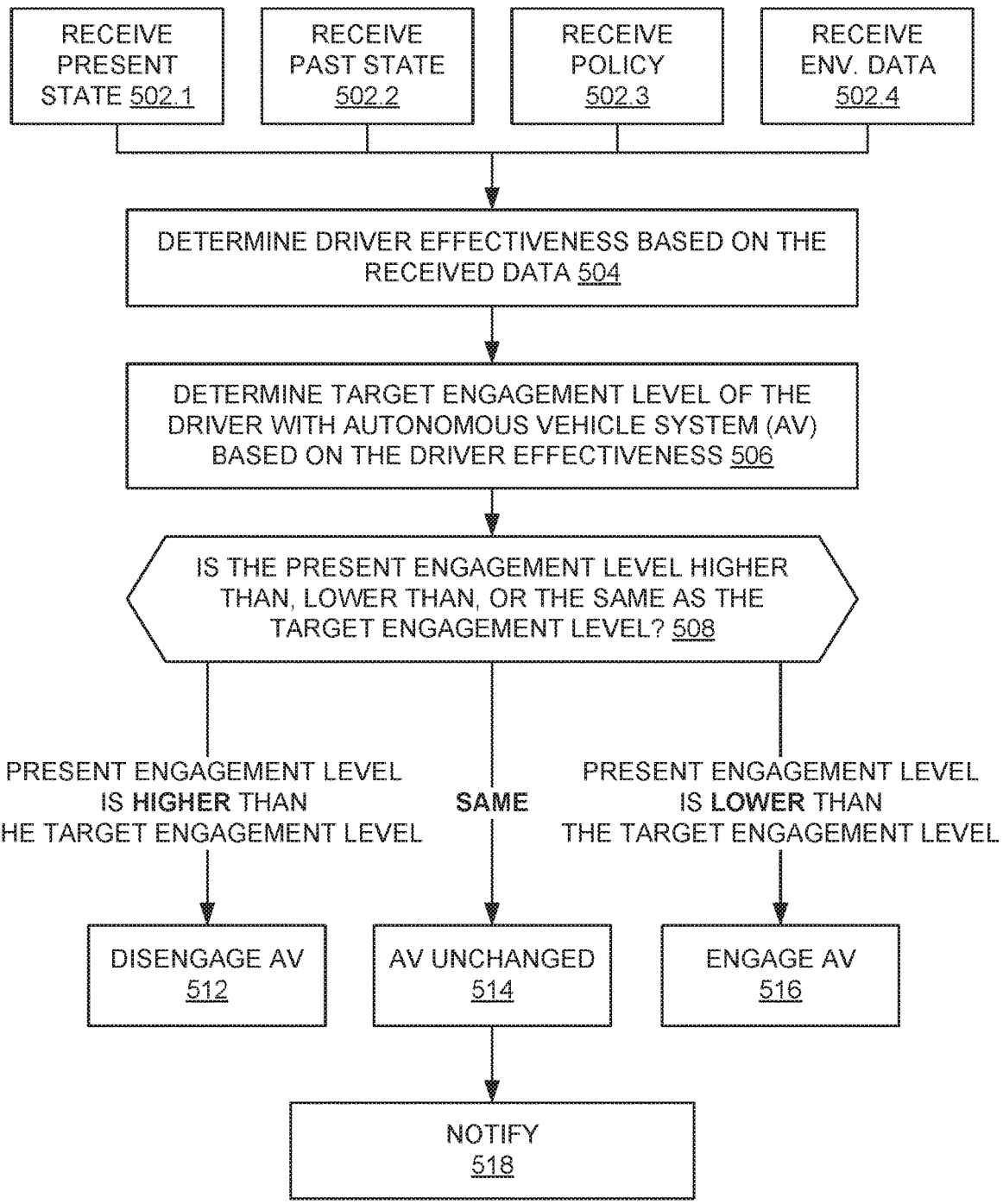
FIG. 5 is a flowchart illustrating an embodiment of a process for determining driver engagement with an autonomous vehicle system.

FIG. 5 is a flow diagram illustrating an embodiment of a method 500 for controlling driver interaction with an AV. The method 500 can be performed by a processor (e.g., the processor 102 and/or the vehicle data server 108 of FIG. 1).

In 502.1, the method 500 receives present state data. The present state data includes data about a current state of the driver such as reactions to the environment, alertness, emotion, and the like. The present state data can include or be based on one or more sensor readings. Present state data about a driver can include an evaluation of the driver's performance. For example, a sensor reading can be compared with a target or threshold value to determine deviation from an expected value. The deviation can indicate the driver's performance such as the driver's effectiveness. Example sensors include video recorders and audio recorders. A video recorder with 4D imaging capabilities determines what the driver is currently doing based on detection of the position and movement of the driver's body. The video recorder can detect an activity that a driver is engaged in such as reading a book, texting, sleeping, and the like. The video recorder can detect eye movement to determine a driver's state. For example, frequent eye blinking indicates that the driver is likely to be drowsy. The audio recorder can detect sounds inside the vehicle. For example, a yawn indicates that the driver is likely to be drowsy. As further described herein, other sensors and combinations of sensors are possible. As further described herein, the present data can be evaluated in accordance with the other received data.

In 502.2, the method 500 receives past state data. The past state data includes data about the vehicle and a past state of the driver. The vehicle data includes information about the vehicle such as make, model, and maintenance history. The past state information can be stored as an analytical model associated with an identity of the driver. The vehicle data can affect driver behavior and be used to predict driver behavior. The past state of the driver can include events such as how recently the driver napped, the duration of a previous work shift, and the like. The past state of the driver can be captured in a behavior profile. The behavior profile includes an identification of the driver and the driver's behavioral patterns. The past behavior of the driver can predict future driving behavior. For example, a driver will likely react to a future situation in a similar way to how the driver reacted to similar situations in the past. The driver's past performance and interaction with an AV can also predict future interactions with the AV. Thus, the identification of the driver (e.g., a corresponding behavior profile) indicates a general effectiveness or experience of the driver and establishes expectations for driver behavior and reactions to road conditions. As further described herein, the present data can be evaluated in accordance with the other received data.

In 502.3, the method 500 receives policy data. The policy data includes data about policies or rules that apply to a driver and/or a vehicle. The policy data can be pre-defined, for example by an administrator or dispatcher. In some instances, the policy can override at least some of the other received data (present state, past state, environment data). For example, the policy can provide that AV should not be engaged when the vehicle is in a construction zone, regardless of driver effectiveness. As further described herein, the present data can be evaluated in accordance with the other received data.

In 502.4, the method 500 receive environment data. The environment data includes information about the conditions exterior to the vehicle. For example, the environment data include weather information (whether it is raining, snowing, windy, etc.), road conditions, and the like. The environment data can influence the determination of the engagement level because aspects of the exterior conditions of the vehicle can affect the driver's alertness, effectiveness, etc. For example, it can be more difficult to control a vehicle in icy conditions. The environment data 502.4 can also be used in combination with the policy data 502.3 to determine whether one or more conditions have been fulfilling for a policy to affect the determination of driver effectiveness, as further described herein. As further described herein, the present data can be evaluated in accordance with the other received data.

In 504, the method 500 determines the driver's effectiveness based on the received data, e.g., present data 502.1, past state data 502.2, policy data 502.3, and/or environment data 502.4. The driver's effectiveness is determined by the present state data received in 502.1. For example, the driver's effectiveness is directly related to the alertness of the driver and inversely related to the driver's drowsiness.

The driver's effectiveness is also determined by the past state data received in 502.2. For example, how easily the driver gets drowsy or distracted affects his effectiveness. As another example, the driver's age, experience with a particular type of vehicle, physical fitness, previous traffic violations, and the like affects his effectiveness. Certain past events such as a suspended driver's license can disqualify the driver from driving. The driver's pattern of behavior can also indicate the driver's effectiveness over the course of a trip. As described herein, the driver's past behavior can predict future behavior. Thus, a driver's past pattern of behavior can indicate his effectiveness.

The driver's effectiveness is also determined by the policy data received in 502.3. For example, the policy data can determine how to evaluate the received present state data 502.1 and the past state data 502.2. The policy can increase or lower a driver effectiveness score by defining how to treat received data. For example, the policy can be defined as a rule, taking in received data and outputting an appropriate driver effectiveness score. A policy can be that an AV is set to improve safety in a rainy situation (e.g., measured rainfall exceeds a threshold). Given a same level of driver effort, the inclement weather can render the driver less effective than in fair weather. Thus, it may be desirable to evaluate driver effectiveness differently in some situation, where the different evaluation is defined by the policy. For instance, if the AV is rudimentary and would not perform as well as the driver in a rainy situation, the AV is disengaged. Otherwise, the AV is engaged. In other words, the AV can be set depending on an evaluation of whether the AV is more or less effective than the driver in a rainy situation. Accordingly to the policy, if the received data indicates that it is rainy, driver effectiveness can be decreased. As another example, when it is rainy, the driver effectiveness score can be automatically lowered to below a threshold, causing an AV to be set to improve safety.

The driver's effectiveness is also determined by the environment data received in 502.4. For example, the environment data can determine how to evaluate the received present state data 502.1, past state data 502.2, and policy data 502.3. The environment data can increase or lower a driver effectiveness score as follows. If the received data indicates that the road is icy, driver effectiveness can be automatically decreased. The amount by which the driver effectiveness is changed can depend on the identity of the driver. For example, if a driver consistently performs 25% worse on icy roads than non-icy roads (e.g., reflected by past state data), the driver effectiveness score can be lowered accordingly when an icy condition is detected from the received environment data.

The driver's effectiveness can change during the course of a trip. For example, a driver who, in the past, has exhibited decreased effectiveness after six hours of driving is expected to have decreased effectiveness after six hours on a current trip. The method 500 can score the driver's effectiveness. The driver's effectiveness score can be determined based on a weighting of factors including a weighting of present and past state data.

In 506, the method 500 determines a target engagement level of the driver with the AV based on the effectiveness of the driver. For instance, a relatively effective driver has a higher target engagement level because an effective driver is better prepared to take over control of the vehicle and transition between engagement and disengagement of the AV compared with a less effective driver. On the other hand, a relatively ineffective driver has a lower target engagement level because an ineffective driver has a more difficult time taking control of the vehicle and transitioning between engagement and disengagement of the AV. The target engagement level can be determined dynamically as the target engagement level may change with a driver's changing effectiveness. For example, a driver who is historically ineffective after being idle for six hours may have a relatively high target engagement level at the beginning of the six-hour period and a relatively low target engagement level at the end of the six-hour period. The target engagement level can define, among other things, (i) how frequently the AV is engaged when the driver is inside the vehicle, (ii) driving situations in which the AV should be engaged, and (iii) whether or not a driver should be in control of the vehicle. Whether a driver should be in control of a vehicle may be due to various factors such as a need to practice a driving skill or the driver's readiness to operate a vehicle having an AV system. In an embodiment, one or more of the factors can be more heavily weighted or override one or more of the other factors in making the determination of whether the driver should be in control of the vehicle.

In 508, the method 500 determines whether the present engagement level of the driver with the AV is higher than, lower than, or the same as the target engagement level. The present engagement level of the driver with the AV is a measure of how engaged the driver is with the AV. The driver's engagement with the AV is high if the AV is engaged and controlling the vehicle. The driver's engagement with the AV is low if the AV is disengaged and not controlling the vehicle.

In 508, if the method 500 determines that the present engagement level is higher than the target engagement level, the method 500 proceeds to 512, in which the method makes a recommendation to disengage the AV system. The recommendation may be in the form of an audio signal, a visual signal, a haptic signal, or the like to prompt the driver to disengage the AV system. In an alternative embodiment, the method 500 automatically disengages the AV system. In some embodiments, when the AV system is disengaged, the driver takes over control of the vehicle and has an opportunity to practice a driving skill. This helps a driver to maintain or improve the driving skill. In some embodiments, when the AV system is disengaged, the vehicle will be automatically guided to a stop. This improves safety by preventing the driver from operating the vehicle when the driver is unfit. As described herein, in 512, disengaging the AV may include providing a warning to the driver prior to the disengagement, the timing of the warning being dependent on the driver's effectiveness determined in 504.

In 508, if the method 500 determines that the present engagement level is the same as the target engagement level, the method 500 proceeds to 514, in which the AV system remains unchanged.

In 508, if the method 500 determines that the present engagement level is lower than the target engagement level, the method 500 proceeds to 516, in which the method makes a recommendation to engage the AV system. The recommendation may be in the form of an audio signal, a visual signal, a haptic signal, or the like to prompt the driver to engage the AV system. In an alternative embodiment, the method 500 automatically engages the AV system. In some embodiments, when the AV system is engaged, the driver relinquishes control of the vehicle. This can allow the driver to rest for a period of time, while the AV controls the vehicle. In some embodiments, the driver continues to monitor the vehicle while the AV is engaged, e.g. keeping hands on a steering wheel. As further described herein, engaging the AV may include providing a warning to the driver prior to the engagement, the timing of the warning being dependent on the driver's effectiveness determined in 504.

In some embodiments, in 518, the method 500 provides a notification responsive to engagement or disengagement of the AV. The notification includes information about the state of the AV such as the circumstances for the change to the AV. For example, the notification is sent over a network to a central server (e.g., the vehicle data server 108 of FIG. 1). In some embodiments, a dispatcher can view the notification and use the information in the notification to determine whether the driver needs further coaching or work with a simulator. In some embodiments, the determination of whether the driver needs further coaching or work with a simulator is performed systematically or automatically, as further described herein.

The timing of providing a warning vary with the driver effectiveness (e.g., providing a warning in 414, 416 of FIG. 4 or 512, 516 of FIG. 5). For example, the timing of providing the warning can be proportional to the driver effectiveness. As another example, if the driver effectiveness is below a threshold, the timing can be set above a warning threshold. If the driver effectiveness is above a threshold, the timing can be set below a warning threshold. This means that if the driver is relatively ineffective, the driver is warned earlier than a driver who is relatively effective, giving the ineffective driver more time to prepare for a change. The timing of the warning can be defined as a target time, where the warning is provided at or before the target time.

Figure 6:
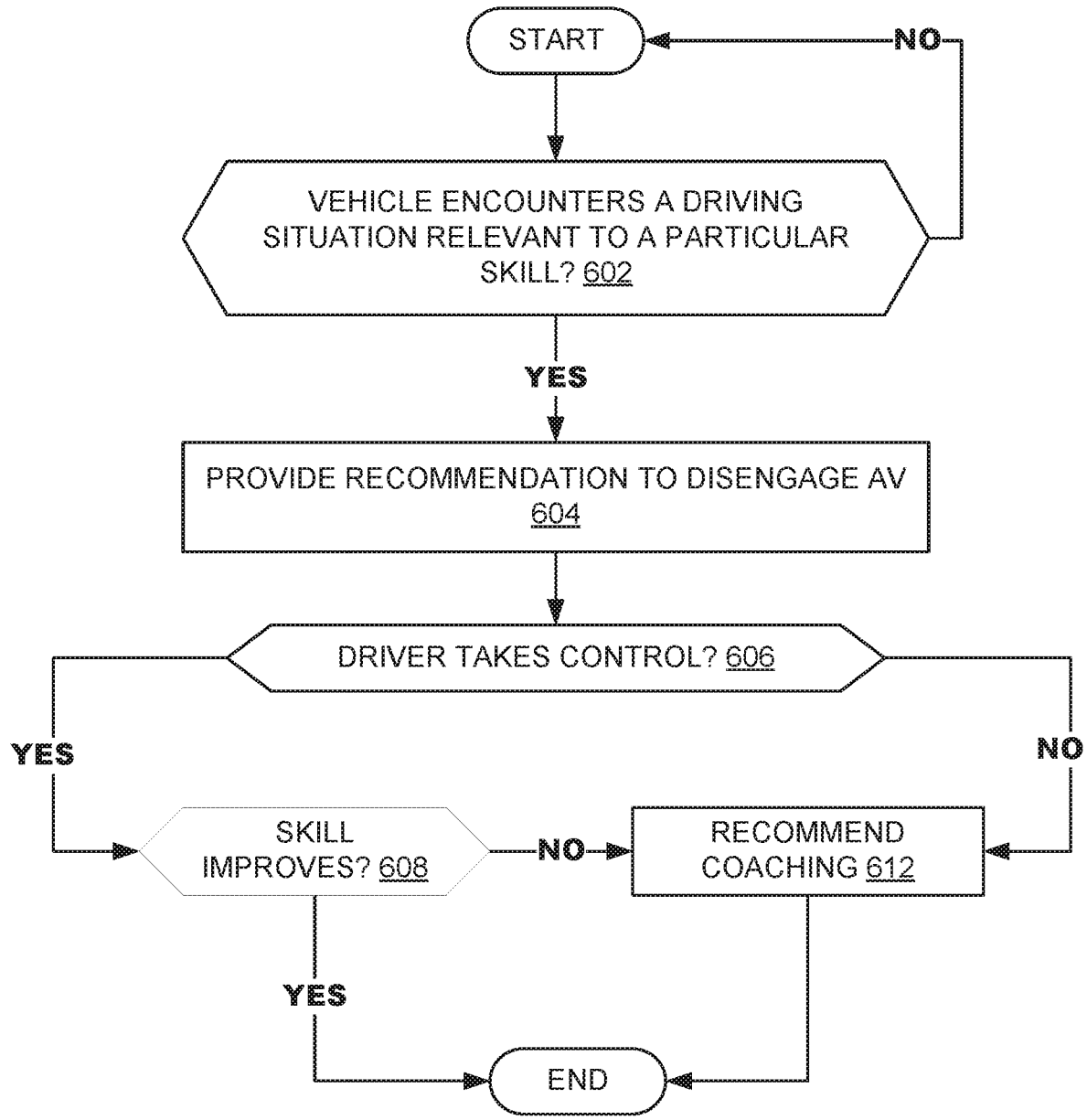
FIG. 6 is a flowchart illustrating an embodiment of a process for practicing a driver skill.

FIG. 6 is a flow diagram illustrating an embodiment of a method 600 for controlling driver interaction with an AV. The method 600 determines whether the driver can benefit from further coaching or work with a simulator. For instance, even where a driver may be adequately effective to allow the AV to take control of the vehicle, the AV can nevertheless be disengaged to allow the driver to practice controlling the vehicle. The method 600 can be performed by a processor (e.g., the processor 102 and/or the vehicle data server 108 of FIG. 1).

In 602, the method 600 determines whether a vehicle is encountering a driving situation that is relevant to a particular skill. For example, a skill can be navigating a windy one-lane road. When the vehicle enters a stretch of road that is a windy one-lane road, the situation would be relevant to the particular skill. The determination can be made based on received sensor data, present state data, and/or map data. Examples of sensor data and present state data collection are described herein. For example, the sensor data is information collected by the sensors 104 in FIG. 1. As another example, the present state data is information about the vehicle and/or the driver stored in the data storage 204 in FIG. 2. As another example, the map data includes data embedded in maps. The embedded map data includes information associated with geolocation features such as number of lanes, incline, speed limit, traffic control devices (e.g., traffic lights), and the like. In some embodiments, the maps are stored in data storage 204 in FIG. 2.

If the vehicle is not encountering a driving situation relevant to a particular skill, control returns to the start, in which the method continues to monitor whether the vehicle encounters a driving situation relevant to a particular skill.

If the vehicle is encountering a driving situation relevant to a particular skill, control passes to 604 in which the method 600 provides a recommendation to disengage the AV. In some instances, the recommendation can be based on a current state of the AV. For example, if the AV is engaged or active, the recommendation can be a notification to change the state of the AV to disengaged. If the AV is inactive or disengaged, the recommendation can be a notification to maintain the state of the AV or no notification can be made. The recommendation can provide the driver with an opportunity to take control of the vehicle and practice a skill.

In 606, the method 600 determines whether the driver takes control. If the driver takes control of the vehicle, the method can monitor the behavior of the driver and/or the vehicle to determine whether the skill improves in 608. The determination of whether the skill improves can be based on collected data about the driver and/or the vehicle. For example, driver behavior can be tracked over time, and after the driver exceeds a threshold number of successful maneuvers, the skill can be determined to have improved. Using the example of navigating a windy one-lane road. A driver can be evaluated based on controlling the vehicle to stay within lane markers. When the driver stays within the lane markers for a period of time exceeding a threshold or for a number of turns exceeding a threshold, the skill is determined to have improved. In an alternative embodiment (not shown), the determination can be of whether the skill is maintained rather than improved. The maintenance of a skill can be determined based on collected data about the driver and/or the vehicle. For example, driver behavior can be tracked over time, and after the driver exceeds a threshold number of successful maneuvers, the skill can be determined to have been maintained. In this way, driver skill can be maintained and/or improved for vehicles having an AV.

If the driver's skill improves in 608, the method can terminate. Otherwise, if the driver's skill does not improve in 608, the method can provide a recommendation for further coaching in 612. In an embodiment, the recommendation can be provided to a dispatcher, who uses this information to determine whether the driver needs further coaching or work with a simulator. In another embodiment, the recommendation can be provided to the driver and further opportunities to practice the skill can be provided. For example, an AV can be disengaged (or remain disengaged) when the vehicle encounters a situation relevant to the skill.

In 606, if the driver does not take control of the vehicle, control can pass to 612, in which the method recommends coaching. The recommendation can be provided to a dispatcher, who uses this information to determine whether the driver needs further coaching or work with a simulator. The further coaching can be performed in various other settings.

The techniques described herein find application in a variety of situations. For example, vehicles can be grouped into platoons (also known as "platooning") which typically involves the vehicles driving at substantially the same speed and with relatively small spacing between the vehicles. There are numerous benefits of platooning including greater fuel economy, reduced congestion, shorter commutes, fewer traffic collisions, and reduced driver fatigue. However, if one or more vehicles in the platoon deviates from expected behavior, there is an increased likelihood of accidents for other vehicles in the platoon in a domino-effect. One or more vehicles and/or drivers in a platoon can be monitored according to the techniques described herein and platooning can be engaged or dis-engaged based on a driver's behavior such as alertness or effectiveness.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, by a processor, a signal indicating a present state of a driver associated with a vehicle, wherein the vehicle has an autonomous system (AV) for autonomous operation;
   receiving, by the processor, a signal indicating a past state of the driver;
   scoring, by the processor, effectiveness of the driver based at least in part on the received signals;
   determining, by the processor, a target level of engagement of the driver with the AV system based on the driver effectiveness score;
   determining, by the processor, whether a present driver engagement level meets the target engagement level;
   in response to a determination that the present driver engagement level meets the target engagement level, at least one of (i) outputting a recommendation to the driver to disengage the AV system and (ii) automatically disengaging the AV system; and
   in response to a determination that the present driver engagement level is less than the target engagement level, at least one of (i) outputting a recommendation to the driver to engage the AV system and (ii) automatically engaging the AV system.

2. The method of claim 1, wherein the target level of engagement defines whether to recommend that the driver operate the vehicle in a non-autonomous mode.

3. The method of claim 1, further comprising:
   receiving, by the processor, a policy, wherein the determination of the target level of engagement is further based on the policy.

4. The method of claim 3, further comprising:
   at least one of (i) providing, by the processor, a recommendation to the driver and (ii) changing, by the processor, a mode of operation of the AV system, based on a determination, by the processor, that the policy has been violated.

5. The method of claim 1, wherein the determination of the target level of engagement is further based on an attentiveness level of the driver sufficient to maintain an experience rating.

6. The method of claim 1, wherein the determination of the target level of engagement is further based on an attentiveness level of the driver sufficient to operate the vehicle in an autonomous mode.

7. The method of claim 1, further comprising:
determining, by the processor, whether to recommend coaching for the driver based on the effectiveness of the driver.

8. The method of claim 1, further comprising:
determining, by the processor, whether to recommend simulation training for the driver based on the effectiveness of the driver.

9. The method of claim 1, wherein the present state signal is based on a detection, by a sensor, of driver activity.

10. The method of claim 1, wherein the determination of the target level of engagement includes determining a target time for disengaging the AV system.

11. The method of claim 1, wherein the determination of the target level of engagement includes determining a target time for providing a warning to the driver regarding disengagement of the AV system.

12. The method of claim 1, further comprising:
determining a target time for disengaging the AV system.

13. The method of claim 1, further comprising:
determining a target time for providing a warning regarding disengagement of the AV system.

14. The method of claim 1, wherein the past state signal is based at least in part on when the driver napped.

15. The method of claim 1, wherein the past state signal includes at least one of: vehicle information, environment, and driver behavioral information.

16. The method of claim 1, further comprising:
receiving, by the processor, environment data indicating a driving situation;
determining, by the processor, whether the AV system performs or is expected to perform below a threshold when encountering the driving situation;
if the AV system performs below the threshold, at least one of: making a recommendation to the driver and disengaging the AV system.

17. The method of claim 16, further comprising:
responsive to driver operation of the vehicle in a non-autonomous mode in the driving situation, determining, by the processor, whether a skill of the driver has improved;
if the skill of the driver has not improved, recommending, by the processor, coaching for the driver.

18. The method of claim 1, further comprising:
determining, by the processor, based on at least one of sensor data, map data and environment information, that the vehicle is encountering a driving situation relevant to a skill set of the driver;
at least one of:
providing, by the processor, a recommendation to the driver to operate the vehicle in a non-autonomous mode;
disengaging, by the processor, the AV system.

19. A system for controlling driver interaction with an autonomous vehicle (AV) system for a vehicle, the system comprising:
a processor configured to:
receive a signal indicating a present state of a driver associated with an vehicle, wherein the vehicle has an autonomous system (AV) for autonomous operation;
receive a signal indicating a past state of the driver;
score effectiveness of the driver based at least in part on the received signals;
determine a target level of engagement of the driver with the AV system based on the driver effectiveness score;
determine whether a present driver engagement level meets the target engagement level;
in response to a determination that the present driver engagement level meets the target engagement level, at least one of (i) output a recommendation to the driver to disengage the AV system and (ii) automatically disengage the AV system; and
in response to a determination that the present driver engagement level is less than the target engagement level, at least one of (i) output a recommendation to the driver to engage the AV system and (ii) automatically engage the AV system; and
a non-transitory memory coupled to the processor and configured to provide the processor with instructions.

20. A computer program product for controlling driver interaction with an autonomous vehicle (AV) system for a vehicle, the computer program product being embodied in a non-transitory computer-readable storage medium and comprising computer instructions for:
receiving, by a processor, a signal indicating a present state of a driver associated with an vehicle, wherein the vehicle has an autonomous system (AV) for autonomous operation;
receiving, by the processor, a signal indicating a past state of the driver;
scoring, by the processor, effectiveness of the driver based at least in part on the received signals;
determining, by the processor, a target level of engagement of the driver with the AV system based on the driver effectiveness score;
determining, by the processor, whether a present driver engagement level meets the target engagement level;
in response to a determination that the present driver engagement level meets the target engagement level, at least one of (i) outputting a recommendation to the driver to disengage the AV system and (ii) automatically disengaging the AV system; and
in response to a determination that the present driver engagement level is less than the target engagement level, at least one of (i) outputting a recommendation to the driver to engage the AV system and (ii) automatically engaging the AV system.

* * * * *

UNITED STATES PATENT AND TRADEMARK OFFICE
CERTIFICATE OF CORRECTION

PATENT NO. : 10,545,499 B2
APPLICATION NO. : 16/240038
DATED : January 28, 2020
INVENTOR(S) : Brett Hoye It is certified that error appears in the above-identified patent and that said Letters Patent is hereby corrected as shown below:

In the Specification

In Column 10, Line(s) 9, delete "receive environment data." and insert --receives environment data.--, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*